United States Patent [19]

Harwood

[11] Patent Number: 4,611,240

[45] Date of Patent: Sep. 9, 1986

[54] CHROMINANCE PROCESSOR CONTROL SYSTEM

[75] Inventor: Leopold A. Harwood, Bridgewater, N.J.

[73] Assignee: RCA Corporation, Princeton, N.J.

[21] Appl. No.: 594,398

[22] Filed: Mar. 28, 1984

[51] Int. Cl.[4] .............................................. H04N 9/64
[52] U.S. Cl. ........................................ 358/23; 358/28; 358/19
[58] Field of Search .................... 358/23, 28, 35, 19

[56] References Cited

U.S. PATENT DOCUMENTS

| | | | |
|---|---|---|---|
| 3,679,816 | 7/1972 | Avins et al. | 358/28 |
| 4,051,519 | 9/1977 | Harwood | 358/28 |
| 4,130,831 | 12/1978 | Isono et al. | 358/28 |
| 4,403,244 | 9/1983 | Fujishima | 358/19 |

Primary Examiner—John W. Shepperd
Attorney, Agent, or Firm—Eugene M. Whitacre; Paul J. Rasmussen; William H. Meagher

[57] ABSTRACT

In a color TV receiver, a color AFPC loop, responsive to line rate synchronizing bursts of subcarrier frequency derived from the output of a first of a pair of cascaded chrominance signal amplifiers, controls the frequency and phase of an output of a VCO. The VCO output is passed through a variable phase shifter external to the AFPC loop to develop reference oscillations for use by color demodulators. Control of the variable phase shifter is effected by the output of a phase detector which compares the phases of (a) an output of the variable phase shifter and (b) line rate synchronizing bursts derived from an output of the second chrominance signal amplifier.

3 Claims, 1 Drawing Figure

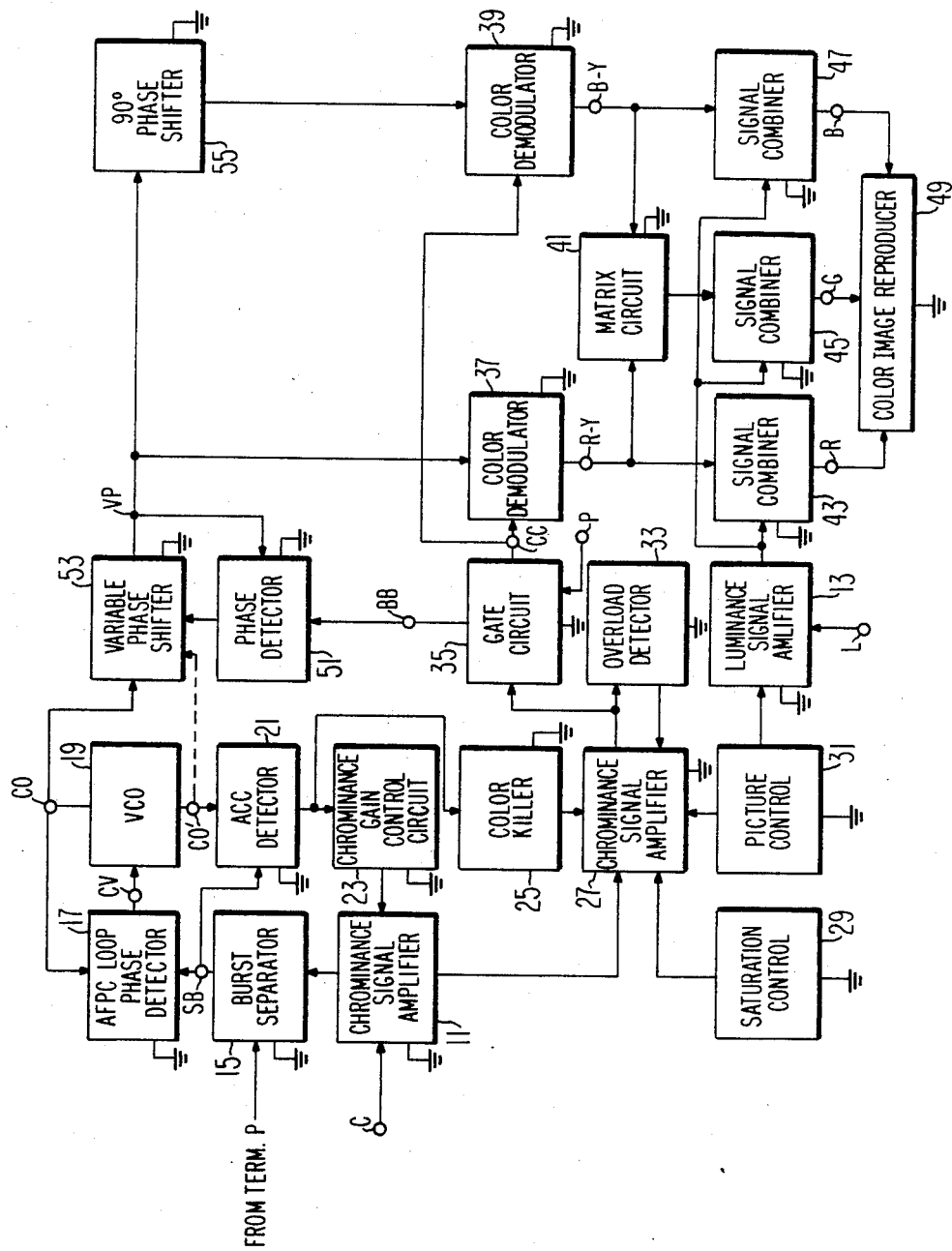

CHROMINANCE PROCESSOR CONTROL SYSTEM

The present invention relates generally to control systems for use in the processing of the chrominance component of composite color television signals, and particularly to a control system in which static phase errors resulting from an AFPC loop's control of a color reference oscillator are automatically subject to external compensation by apparatus responsive to the phasing of line rate synchronizing bursts accompanying the chrominance component being processed.

A conventional approach to color synchronization in color television receivers employs an AFPC control loop to control the frequency and phase of a color reference oscillator from which reference oscillations are derived for use in demodulation of the modulated color subcarrier waves which form the chrominance component of composite color television signals processed by the color TV receiver. In the AFPC control loop, a phase detector compares the phase of an output of a VCO (voltage controlled oscillator) serving as the color reference oscillator with the phase of color synchronizing bursts (the bursts comprising oscillations of color subcarrier frequency and reference phase, which accompany the chrominance component and recur at a line rate) to develop a control voltage for application to the VCO.

Where the free-running frequency of the VCO coincides with the incoming subcarrier frequency, the loop is effective in establishing and maintaining a predetermined (quadrature) phase relationship between the respective inputs to the phase detector. When, however, the free-running frequency of the VCO differs from the incoming subcarrier frequency, the loop functions to alter the VCO's operating frequency so as to match the incoming subcarrier frequency. Under such conditions of altered operating frequency, a static phase error is necessarily present. That is, when the loop is stablized, the phase relationship between the phase detector inputs differs from the desired quadrature phase relationship in accordance with a phase error of a magnitude and sense dependent upon the magnitude and sense of the frequency difference required to be overcome.

In the absence of compensation for the aforementioned static phase error, there will be resultant errors in the coloring of a color image displayed in response to the color-difference signals recovered by the color demodulators of the receiver. While a color television receiver may incorporate a manual control providing a facility external to the AFPC loop for adjusting the phasing of the reference oscillations supplied to the color demodulators, reliance upon a viewer's accurate manual adjustment of such a control is a relatively unsatisfactory solution to the static phase error compensation problem.

In accordance with the principles of the present invention, automatic compensation is provided for the static phase error that results when operation of a color AFPC loop imposes an altered operating frequency upon the receiver's color reference oscillator, with the error compensation system employing a variable phase shifter for the reference oscillations external to the AFPC loop, and subject to automatic control by means responsive to the phasing of the received line rate bursts.

By virtue of the aforementioned reliance upon the phasing of the received line rate bursts to obtain control information, the control system of the present invention differs markedly from systems (such as that described in the article entitled "A Newly Developed Correction System Of Transmission Distortion With Vertical Interval Reference Signal", by J. Nishimura, et al., appearing on pp. 71-80 of the February, 1979 issue of IEEE Transactions on Consumer Electronics, Vol. CE-25) which rely upon sensing of a VIR (Vertical Interval Reference) signal, of a field rate of recurrence, to obtain control information for phase adjustment of reference oscillations.

Systems of the VIR control type are capable of introducing phase corrections only if the received signal includes a VIR signal component (transmission of which is not mandatory), and involve such complexities as line-identification circuitry so as to identify the timing of the line in which the VIR signal component may appear, VIR presence detectors so as to differentiate between received signals bearing VIR signal information and received signals not containing such information, and correction disabling circuits so as to preclude false correction during reception of signals lacking the VIR component. The system of the present invention provides automatic compensation of coloring errors resulting from a static phase error under all composite color television signal reception conditions, and without the aforementioned complexities of VIR control systems.

In a typical color television receiver, the point in the receiver's chrominance channel used for takeoff of the burst input to the receiver's color AFPC loop precedes the location in said channel of a chrominance component amplifying stage or stages subject to gain variation for one or more of a variety of purposes. One such purpose is, for example, manual adjustment of chrominance component gain by a viewer to alter the saturation of the colors of the reproduced image. Another such purpose is a manual adjustment of chrominance component gain in tandem with luminance component gain for so-called "picture control" effects (enabling viewer adjustment of the contrast of the reproduced image without introducing undesired saturation changes). Still another such purpose may, for example, be an automatic control of chrominance component gain for chroma overload avoidance (as described, for example, in U.S. Pat. No. 4,054,905—Harwood, et al.).

Depending upon the technique employed for introduction of each such gain variation, a companion effect to one or more of such gain adjustments can be a variation of the phase shift suffered by the chrominance component in its traversal of the chrominance channel. Such variations in the phase shift of the chrominance component can be an additional source of errors in the coloring of images reproduced in response to color-difference signal information recovered from the chrominance component.

In accordance with an illustrative embodiment of the present invention, a control system is provided which compensates for image coloring errors otherwise introduced by the above-mentioned chrominance component phase shift variations as well as for the image color errors otherwise introduced by the aforementioned static phase error problem. Pursuant to this illustrative embodiment, the reference oscillation phase shifter external to the receiver's color AFPC loop is subject to control by means responsive to the phase relationship between (a) line rate bursts derived from an output of the (post-takeoff) variable gain chrominance amplifier, and (b) an output of the variable phase shifter.

In the accompanying drawing, the sole FIGURE illustrates, by block representation, a portion of a color television receiver incorporating a control system in accordance with an embodiment of the present invention.

The color television receiver of the drawing, illustratively of the NTSC type, includes a chrominance signal amplifier 11, the input of which receives (from a chrominance signal input terminal C) the chrominance signal component of received composite color television signals, and a luminance signal amplifier 13, the input of which receives (from a luminance signal input terminal) the luminance signal component of the received composite color television signals. The chrominance signal component, which comprises modulated color subcarrier waves, is accompanied by color synchronizing information in the form of bursts of subcarrier frequency oscillations recurring at a line rate and timed to occupy a "backporch" portion of recurring horizontal blanking intervals. A burst separator 15, responsive to an output of chrominance signal amplifier 11 and to line rate keying pulses of appropriate "backporch" timing from a burst gating pulse input terminal P, develops separated line rate color synchronizing bursts at a separator output terminal SB.

The illustrated receiver includes a conventional color AFPC loop formed by appropriate couplings between a voltage controlled oscillator (VCO) 19 and an AFPC loop phase detector 17. Detector 17 is responsive to the phase relationship between respective inputs thereto derived from separator output terminal SB and an output terminal CO of the VCO 19, and develops a control voltage output indicative of such relationship at output terminal CV for application to the VCO 19.

VCO 19, which may desirably be of the form shown in U.S. Pat. No. 4,485,353 of Fang, et al., is provided with an additional output terminal CO', at which appear reference oscillations having a quadrature phase relationship with the reference oscillations supplied to phase detector 17 from terminal CO. For conventional automatic chroma control (ACC) purposes, color synchronizing bursts from terminal SB and reference oscillations from terminal CO' are supplied to an ACC detector 21, which develops a control voltage for application to a chrominance gain control circuit 23. Gain control circuit 23 automatically adjusts the gain of the chrominance signal amplifier 11 in a manner opposing variations in the amplitude of the burst component of the amplifier's output.

The amplified chrominance signal component and accompanying color synchronizing component developed by amplifier 11 is supplied as a signal input to an additional chrominance signal amplifier 27. The gain of amplifier 27 is subject to variation in accordance with a plurality of control inputs supplied thereto from a color killer 25, saturation control 29, picture control 31 and an overload detector 33.

Performance of a color killing function in a conventional manner is effected by color killer 25 when required, in response to an output of ACC detector 21. When such output is indicative of the absence of a received burst component, or presence of a received burst component of a magnitude below an appropriate threshold level, killer 25 functions to disable chrominance signal amplifier 27 so as to confine image reproduction to a monochrome representation.

Overload detector 33, functioning in response to an output of amplifier 27 (in the manner described, for example, in U.S. Pat. No. 3,740,462—Harwood), serves to prevent undesired "blooming" effects in the reproduced image by reducing the gain of amplifier 27 under chroma overload conditions. Saturation control 29 provides a manual adjustment facility enabling the viewer to adjust the saturation of the colors of the reproduced image via control of the chrominance signal component gain obtained in amplifier 27. U.S. Pat. No. 4,054,905—Harwood, et al., is illustrative of a preferred manner for associating both a viewer's manual adjustment of chrominance component gain (as via control 29) and automatic overload protection (as via use of detector 33) with chrominance signal amplifier 27.

Picture control 31 provides a manual adjustment facility enabling the viewer to adjust the contrast of the reproduced image without disturbing an otherwise selected saturation setting, the picture control 31 supplying a gain control voltage to the luminance signal amplifier 13 to introduce the desired contrast alteration, while concomitantly altering the gain of the chrominance signal amplifier 27 in a manner precluding any resultant disturbance of saturation.

An output of the gain controlled chrominance signal amplifier 27 is supplied as a signal input to gate circuit 35, which also receives line rate keying pulses of "backporch" timing from the aforementioned burst gating pulse input terminal P. The keyed operation of gate circuit 35 enables development of a separated burst component at gate output terminal BB, and development of a chrominance component freed of the accompanying burst component at gate output terminal CC.

The modulated color subcarrier waves appearing at terminal CC are applied to a pair of color demodulators 37, 39, each of which is also responsive to reference oscillations of subcarrier frequency with respectively different phases. Illustratively, demodulator 37 receives reference oscillations of a phase appropriate to the recovery of red color-difference signals, while demodulator 39 receives reference oscillations of a phase appropriate to recovery of blue color-difference signals. The manner in which the reference oscillation inputs for demodulators 37, 39 are developed will be described subsequently.

The red color-difference signal output of demodulator 37, appearing at output terminal R-Y, is supplied to a signal combiner 43 for combination with a luminance signal output of amplifier 13 so as to develop a red color signal output at combiner output terminal R. The blue color-difference signal output of demodulator 39, appearing at output terminal B-Y, is supplied to a signal combiner 47 for combination with the luminance signal output of amplifier 13 so as to develop a blue color signal output at combiner output terminal B.

The respective color-difference signals appearing at terminals R-Y and B-Y are also supplied to a matrix circuit 41 for combination in a manner forming a green color-difference signal. The green color-difference signal output of matrix circuit 41 is supplied to a signal combiner 45 for combination with the luminance signal output of amplifier 13 so as to develop a green color signal output at combiner output terminal G. A color image representative of the received signals is developed by a color image reproducer 49 responsive to the respective color signals appearing at terminals R, B and G.

To derive the reference oscillations to be supplied to color demodulator 37, the reference oscillations appearing at output terminal CO of VCO 19 are supplied to a variable phase shifter 53. Control of phase shifter 53 is effected by the output of a phase detector 51 in accordance with the phase relationship between the respective inputs thereto, which comprise the separated burst component appearing at output terminal BB of gate circuit 35 and reference oscillations appearing at the output terminal (VP) of the phase shifter 53.

Illustratively, the variable phase shifter 53 comprises means for combining reference oscillations of a substantially fixed magnitude from terminal CO with oscillations bearing a quadrature phase relationship thereto and having a magnitude and polarity controlled by the output of phase detector 51. The quadrature-related oscillations to be controllably processed for this purpose may, for example, be derived from VCO output terminal CO' (as indicated in dotted-line fashion in the drawing). Phase detector 51 and variable phase shifter 53 form an APC control loop functioning to maintain a predetermined (quadrature) phase relationship between the respective inputs to phase detector 51.

The reference oscillations appearing at terminal VP, in addition to serving as the reference oscillation input for demodulator 37, are applied to a 90° phase shifter 55, the output of which comprises the reference oscillation input for demodulator 39.

In operation of the illustrated apparatus, in those instances when the free-running frequency of VCO 19 coincides with the subcarrier frequency of the received color synchronizing bursts, the color AFPC loop 17, 19 functions to maintain the reference oscillations at terminal CO in a quadrature phase relationship with the phase of the received burst component appearing at terminal SB. In those instances, however, when the free-running frequency of VCO differs from the subcarrier frequency of the received color synchronizing bursts, the color AFPC loop 17, 19 functions to adjust the operating frequency of VCO 19 to match the subcarrier frequency of the received color synchronizing bursts. Continuous operation of VCO 19 at the altered frequency requires the continued presence of an error voltage DC component at the detector output terminal CV. Necessarily associated with the continued development of such an error voltage DC component is the existence of a static phase error, i.e., a maintained departure from the otherwise expected quadrature phase relationship between the respective inputs to phase detector 17. The magnitude and sense of such departure from a quadrature phase relationship will, of course, depend upon the magnitude and sense of the frequency difference required to be overcome.

Thus, where the phase of the oscillations of the burst component corresponds to the −(B-Y) phase (as in standard NTSC signals), the AFPC loop 17, 19 will function to maintain the reference oscillations at terminal CO at a R-Y phase under conditions of frequency coincidence between VCO free-running frequency and subcarrier frequency of received bursts. But, in the absence of such frequency coincidence, the reference oscillations depart from the R-Y phase to a degree representing the aforementioned static phase error.

If the reference oscillations appearing at terminal CO were applied directly to the reference oscillation input of the (R-Y) demodulator 37 (and via only phase shifter 55 to the reference oscillation input of the B-Y demodulator 39), the image developed by reproducer 49 would be subject to the appearance, during the existence of the aforesaid static phase error, of hue errors of a magnitude and sense determined by the magnitude and sense of said static phase error. However, in the illustrated system, variable phase shifter 53 provides a facility for automatically compensating for the effects of the aforementioned static phase error. Where, for example, a static phase error resulting from the absence of frequency coincidence causes the reference oscillations at terminal CO to depart from the R-Y phase in a leading direction, sensing of this departure by phase detector 51 causes introduction of a compensating phase lag by variable phase shifter 53.

The APC loop 51, 53 of the illustrated apparatus, moreover, performs an additional error correcting service now to be explained. As explained above, the operation of the AFPC loop 17, 19 references the phase of the output of VCO 19 to the phase of the burst component appearing in the output of chrominance signal amplifier 11. The chrominance component appearing in the output of chrominance signal amplifier 11, however, is not directly applied to the demodulators 37, 39, but, rather, must traverse a signal path, inclusive of the gain controlled chrominance signal amplifier, in which it suffers some degree of phase shift. If the phase shift suffered in such traversal were predeterminable and fixed, compensation therefor could be provided in a relatively simple fashion by introduction of a compensating phase shift of fixed magnitude in the reference oscillation path to the demodulators.

Actually, however, the phase shift suffered in such traversal is not precisely predeterminable and is subject to variation with the operation of the various gain controls associated with amplifier, with the consequence that chrominance component phase shift variations associated with the amplifier gain variations will introduce hue errors in the images developed by reproducer 49 if compensation therefor is not provided. In the illustrated apparatus, however, the APC loop 51, 53 provides a facility for automatically compensating for the aforesaid chrominance component phase shift variations. Should a gain variation, for example, introduce a chrominance component phase shift variation of a lagging sense, the lagging variation of the phase of the accompanying burst component delivered to phase detector 51 will cause phase shifter 53 to provide a compensating adjustment of the phase of the reference oscillations delivered to the color demodulators.

While the present invention has been described above in the particular context of a color television receiver of the NTSC type, it should be appreciated that the invention may also be used to advantage in color television receivers of the PAL type. In such receivers (wherein the color AFPC loop references to the average phase of a "swinging" burst), a static phase error problem is also a result of operation under conditions lacking coincidence between free-running reference oscillator frequency and incoming burst subcarrier frequency. However, where such receivers employ a PAL decoder of the delay line type (as is usual), the image coloring errors that result from the static phase error are errors in saturation, rather than hue. The present invention can be used to advantage to automatically compensate for such saturation errors resulting from a static phase error, as well as to compensate for saturation errors that may result from chrominance component phase shift variations of the type discussed previously.

It should also be noted that the present invention may be readily adapted to use in NTSC color television receivers employing demodulation axes other than the R-Y and B-Y axes of the illustrative example (e.g., in receivers employing I and Q demodulation axes).

It is conventional in prior art color television receivers to provide the VCO serving as the color reference oscillator with a facility for adjustment of its free-running frequency. The adjustment facility may, for example, comprise a variable capacitor, in a frequency determining filter (as shown in U.S. Pat. No. 4,020,500—Harwood). Another example is the DC control voltage adjusting potentiometer described in U.S. Pat. No. 4,485,354 of R. L. Shanley, et al., The expense associated with provision of such an adjustment facility, and the expense associated with factory adjustment thereof during assembly of the color TV receiver, may be conveniently eliminated when the receiver incorporates a phase error compensation system in accordance with the present invention. Alternatively, if a receiver incorporates both a free-running frequency adjustment facility and a phase error compensation system in accordance with the present invention, one is assured of a significant lessening of any adverse consequences of a misadjustment of the frequency-adjusting facility.

What is claimed is:

1. In a color television receiver subject to reception of composite color television signals inclusive of respective luminance and chrominance components, said chrominance component comprising color subcarrier waves modulated by color-difference signal information indicative of the coloring of a scene and accompanied by color synchronizing information in the form of bursts of oscillations of subcarrier frequency and reference phase recurring at a line rate; chrominance component processing apparatus comprising:

a voltage controlled oscillator;

means for forming an AFPC loop for controlling the frequency and phase of oscillations developed by said voltage controlled oscillator, said AFPC loop forming means including a phase detector developing an oscillator control voltage having a magnitude and sense indicative of the magnitude and sense of any departure from a quadrature phase relationship between an output of said oscillator and said line rate bursts of the received chrominance component; said AFPC loop, in the presence of a difference between the free-running frequency of said oscillator and the frequency of said color subcarrier oscillation bursts, functioning to stabilize the operating frequency of said oscillator at a frequency altered from said free running frequency so as to match the frequency of said color subcarrier oscillation bursts, with said oscillator output, under such altered operating frequency conditions, exhibiting a departure from said quadrature phase relationship which constitutes a static phase error of a magnitude dependent upon the magnitude of said frequency difference;

a plurality of color demodulators, responsive to received modulated color subcarrier waves and to respective reference oscillations developed in response to an output of said oscillator, for recovering color-difference signal information from said received chrominance component;

means, responsive to said recovered color-difference signal information, for reproducing an image of said scene, wherein, during operation under said altered operating frequency condition, said reproduced image is subject to the appearance of errors in the image coloring in the absence of compensation for said static phase error; and a static phase error compensation circuit including:

a variable phase shifter, external to said AFPC loop, having an input responsive to an output of said oscillator, and having an output from which said reference oscillations are derived; and means, independent of said demodulators and responsive to the phasing of said line rate bursts, for automatically causing said variable phase shifter, during operation under said altered operating frequency condition, to alter the phasing of said reference oscillations in a direction tending to reduce the image coloring errors otherwise introduced by said static phase error;

wherein said last-named means comprises an additional phase detector, having a first input coupled to receive an output of said variable phase shifter and a second input coupled to receive only separated line rate bursts, for developing a phase shifter control voltage which is independent of the magnitude of said separated line rate bursts but is continuously representative of the phase relationship between said phase shifter output and said separated line rate bursts, said phase shifter control voltage being determinative of the phase shift introduced by said variable phase shifter.

2. In a color television receiver subject to reception of composite color television signals inclusive of respective luminance and chrominance components, said chrominance component comprising color subcarrier waves modulated by color-difference signal information indicative of the coloring of a scene and accompanied by color synchronizing information in the form of bursts of oscillations of subcarrier frequency and reference phase recurring at a line rate; chrominance component processing apparatus comprising:

a voltage controlled oscillator;

a first chrominance signal amplifier responsive to said modulated color subcarrier waves and accompanying color synchronizing information;

means for forming an AFPC loop for controlling the frequency and phase of oscillations developed by said voltage controlled oscillator, said AFPC loop forming means including a phase detector developing an oscillator control voltage responsive to the phase relationship between an output of said oscillator and line rate bursts amplified by said first chrominance signal amplifier;

a second chrominance signal amplifier responsive to the modulated color subcarrier waves and line rate bursts amplified by said first chrominance signal amplifier;

means for varying the gain of said second chrominance signal amplifier;

a gating circuit, responsive only to an output of said second chrominance signal amplifier and to line rate gating pulses, for developing modulated color subcarrier waves freed from accompaniment by said line rate bursts at a first gating circuit output, and for developing only separated line rate bursts at a second gating circuit output;

a variable phase shifter, external to said AFPC loop and responsive to an output of said oscillator and to a phase shifter control voltage, for developing an oscillatory output with a phasing dependent upon the magnitude and sense of said phase shifter control voltage;

a plurality of color demodulators, responsive to modulated color subcarrier waves derived from said first gating circuit output, and to respective reference oscillations derived from said oscillatory output of said variable phase shifter, for developing respective color-difference signal outputs;

means, independent of said plurality of demodulators, for developing a DC voltage having a magnitude and sense dependent upon the phase relationship between an oscillatory output of said variable phase shifter and line rate bursts derived from said second gating circuit output; and means for utilizing said DC voltage as said phase shifter control voltage;

wherein said DC voltage developing means comprises an additional phase detector, having a first input coupled to receive an oscillatory output of said variable phase shifter and a second input coupled to receive only said line rate bursts derived from said second gating circuit output, and having an output at which said DC voltage is developed with dependence upon said phase relationship between said phase shifter output and said separted line rate bursts and with independence of the magnitude of said separted line rate bursts.

3. Apparatus in accordance with claim 2 also including means, responsive to said respective color-difference signal outputs for reproducing an image of said scene, and wherein:

said gain varying means comprises a manual adjustment facility enabling a viewer to adjust the saturation of the colors of said reproduced image.

* * * * *